United States Patent
Triller et al.

(10) Patent No.: US 8,500,582 B2
(45) Date of Patent: Aug. 6, 2013

(54) PLATE-LINK CHAIN

(75) Inventors: Andreas Triller, Bühl (DE); Martin Vornehm, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1068 days.

(21) Appl. No.: 11/809,786

(22) Filed: Jun. 2, 2007

(65) Prior Publication Data

US 2007/0298922 A1    Dec. 27, 2007

Related U.S. Application Data

(60) Provisional application No. 60/812,796, filed on Jun. 12, 2006.

(30) Foreign Application Priority Data

Jun. 10, 2006   (DE) .......................... 10 2006 026 986

(51) Int. Cl.
*F16G 13/04* (2006.01)
*F16H 7/06* (2006.01)

(52) U.S. Cl.
USPC .......................................... 474/215; 474/157

(58) Field of Classification Search
USPC .................................................. 474/215, 157
See application file for complete search history.

(56) References Cited

U.S. PATENT DOCUMENTS

| | | | | |
|---|---|---|---|---|
| 1,534,494 A | * | 4/1925 | Belcher | 474/216 |
| 2,371,283 A | * | 3/1945 | Collier | 474/175 |
| 2,402,356 A | * | 6/1946 | Bacon et al. | 19/244 |
| 2,725,755 A | * | 12/1955 | Riopelle et al. | 474/157 |
| 2,912,722 A | * | 11/1959 | Howell | 19/244 |
| 2,969,180 A | * | 1/1961 | Ives | 235/87 R |
| 3,129,553 A | * | 4/1964 | Weaver | 57/300 |
| 3,213,699 A | * | 10/1965 | Terepin | 474/215 |
| 4,010,656 A | * | 3/1977 | Jeffrey | 474/215 |
| 4,459,123 A | * | 7/1984 | Tatsunaka et al. | 474/87 |
| 4,504,255 A | * | 3/1985 | Rattunde | 474/201 |
| 4,507,106 A | * | 3/1985 | Cole, Jr. | 474/215 |
| 4,553,951 A | * | 11/1985 | Pavone | 474/148 |
| 4,708,701 A | * | 11/1987 | Cole, Jr. | 474/245 |

(Continued)

FOREIGN PATENT DOCUMENTS

| | | |
|---|---|---|
| DE | 10 2005 028 971 A1 | 2/2006 |
| EP | 1 688 640 A1 | 8/2006 |
| WO | WO 2005/038295 A1 | 4/2005 |
| WO | WO 2006/058528 A1 | 6/2006 |

*Primary Examiner* — William A Rivera
*Assistant Examiner* — Henry Liu
(74) *Attorney, Agent, or Firm* — Alfred J. Mangels

(57) ABSTRACT

A plate-link chain for a motor vehicle drive system including conical pulleys. The chain includes a number of link plates hingedly connected with each other by rocker members. The rocker members extend transversely to the longitudinal direction of the chain and within openings in the link plates. The rocker members and link plates bear against each other along curved contact surfaces to transmit power. Rocker member pairs roll against each other on facing curved rolling surfaces at a contact point that moves from an upper area above the center of mass of the rocker member cross section to a lower area below it. The ratio of the distance from the end of the upper area to the center of mass and the distance from the end of the lower area to the center of mass lies in a range of from about 1.1 to about 2.

6 Claims, 4 Drawing Sheets

U.S. PATENT DOCUMENTS

| | | | | |
|---|---|---|---|---|
| 4,781,660 A | * | 11/1988 | Amataka et al. | 474/174 |
| 4,801,289 A | * | 1/1989 | Sugimoto et al. | 474/215 |
| 4,904,231 A | * | 2/1990 | Zimmer | 474/214 |
| 5,026,331 A | * | 6/1991 | Sugimoto et al. | 474/214 |
| 5,119,924 A | * | 6/1992 | Kaminski | 198/803.15 |
| 5,236,399 A | * | 8/1993 | Sugimoto et al. | 474/215 |
| 5,242,333 A | * | 9/1993 | Sugimoto et al. | 474/212 |
| 5,308,288 A | * | 5/1994 | Lackner et al. | 474/92 |
| 5,651,746 A | * | 7/1997 | Okuda | 474/215 |
| 6,142,903 A | * | 11/2000 | Heinrich | 474/215 |
| 6,186,921 B1 | * | 2/2001 | Kotera | 474/215 |
| 6,371,448 B1 | * | 4/2002 | De Angelis | 254/374 |
| 7,357,742 B2 | * | 4/2008 | Wagner et al. | 474/215 |
| 7,384,369 B2 | * | 6/2008 | Wimmer et al. | 476/28 |
| 2004/0248682 A1 | * | 12/2004 | Wagner et al. | 474/215 |
| 2005/0215392 A1 | * | 9/2005 | Wimmer et al. | 476/28 |
| 2006/0058142 A1 | | 3/2006 | Hasebe et al. | 474/215 |
| 2007/0072722 A1 | | 3/2007 | Kamamoto et al. | 474/245 |
| 2007/0238564 A1 | | 10/2007 | Simonov et al. | 474/212 |

\* cited by examiner

PLATE-LINK CHAIN

BACKGROUND OF THE INVENTION

1. Field of the Invention

The present invention relates to a plate-link chain, in particular for a motor vehicle drive system, with a large number of link plates pivotally connected with each other by rocker members that extend transversely to the longitudinal direction of the plate-link chain and are positioned in openings of the link plates.

2. Description of the Related Art

Such chains having link plates and rocker members include curved contact surfaces located on each of the rocker members and on the link plates. The rocker members and link plates bear against each other at the contact surfaces to transmit power. The contact surfaces are provided on upper and lower contact surface areas of the rocker members in the rocker member height direction. Curved rolling surfaces are situated on the rocker members, along which surfaces the rocker members roll against each other to transmit power. In a cross section running in the longitudinal direction of the plate-link chain through a center of mass of the rocker member, the rolling surfaces extend into an upper area above the plane of the cross section and into a lower area below it.

Such a plate-link chain installed in a belt-driven conical-pulley transmission, for example, is also referred to as a rocker member chain. The rocker members, or pressure members, arranged in pairs in plate openings of the link plates, have rolling surfaces with which they roll against each other. In so doing the rocker members receive the tractive force transmitted by the plate-link chain in the form of compressive stresses, and as the reactive force thereto they introduce corresponding forces into the link plates, wherein the transfer of force between the rocker members and the link plates takes place at curved contact surfaces that are formed on the rocker members and on the link plates.

If the plate-link chain is circulating in a belt-driven conical-pulley transmission, as it runs onto a conical disk pair the plate-link chain passes from an extended position into a curved position, and the link plates are subjected to different tensile force loads at their so-called upper strap and lower strap. As the plate-link chain runs through a complete circulation, those tensile forces have steeply rising peak loads that increase the load on the plate material and thus have a negative effect on the service life of the plate-link chain or on its torque transmitting capacity.

Since the pressure forces transmitted between the individual rocker members at the rolling surface are introduced into the link plates, from the pressure forces in the area of the contact surfaces corresponding pressure force transmissions occur here with resulting high surface pressures. If the surface pressures become too high, creep can occur in the area of the contact surfaces, accompanied, in turn, by a limitation of the service life or a limiting of the torque transmitting capacity.

The rocker members bear against each other at their curved rolling surfaces, and they function as a joint. Thus, during a rolling against motion as the chain circulates around two conical pulleys that are spaced from each other, the rolling point between the rolling surfaces of opposing rocker members, seen in a cross sectional view perpendicular to the running direction of the plate-link chain, undergoes a displacement between an upper area above and a lower area below a virtual cross-section plane running through the center of mass in the longitudinal direction of the plate-link chain.

In the case of rocker members of known plate-link chains, the rolling surface so defined lies symmetrically above and below the center of mass of the rocker member. That means, in other words, that the length of the rolling surface in known rocker members, viewed in the direction of rocker member height, extends symmetrically to a cross section plane running through the center of mass in the running direction of the plate-link chain. That form of the rolling surface was made in the case of known plate-line chains on the assumption that a corresponding symmetrical load and thus symmetrical distribution of force on the link plates in the area of the upper and lower contact surfaces is achieved thereby.

But it has now been found that that form of the rolling surfaces on the rocker members, largely symmetrical to the center of mass of the rocker members, results in a significantly more non-uniform surface pressure load on the contact surfaces of the link plates in the upper and lower contact surface areas. Thus, the pressures in the lower contact surfaces, i.e., the transition area of the lower strap of the link plates, close to the axis, are significantly higher than the surface pressures in the upper contact surface area, i.e., in the area between the contact surfaces of the rocker members and the contact surfaces of the upper strap of the link plates.

An object of the present invention is to refine the plate-link chain in such a way that the pressure loading between the lower and upper contact surfaces of the link plates is more uniform, and thus the service life of the plate-link chain can be prolonged, or the torque transmitting capacity of the plate-link chain can be increased.

SUMMARY OF THE INVENTION

The present invention provides for a plate-link chain, in particular for a motor vehicle drive system, with a large number of link plates pivotally connected with each other by rocker members. The rocker members extend transversely to the longitudinal direction of the plate-link chain and are positioned in openings in the link plates. Curved contact surfaces are located on each of the rocker members and the link plates, along which contact surfaces the rocker members and link plates bear against each other to transmit power. The contact surfaces are provided on the upper and lower contact surface area in the rocker member height direction. Curved rolling surfaces are situated on the rocker members, along which the rocker members roll against each other to transmit power. In a cross section extending in the longitudinal direction of the plate-link chain through a center of mass of the rocker members, the rolling surfaces extend into an upper area above the cross section plane and a lower area below it, wherein the ratio of the distance from the end of the upper area to the center of mass and the distance from the end of the lower area to the center of mass lies in a range of from about 1.1 to about 2.

The present invention thus provides a plate-link chain with rocker members whose rolling surfaces have been shifted upward, viewed in the direction of rocker member height, relative to a cross section plane that runs in the longitudinal direction of the plate-link chain and passes through the center of mass of a rocker member. Thus, the rolling surface no longer extends symmetrically relative to the center of mass, but viewed in a projection in the direction of rocker member height still includes the center of mass, so that the upper area above the cross section plane has an end whose distance from the center of mass is about 1.1 to about 2 times as great as the distance from the end of the lower area of the rolling surface to the center of mass.

The plate-link chain thus configured in accordance with the present invention results on the one hand in the surface pressures at the lower contact surfaces between the rocker members and the link plates becoming smaller. Thus, the surface pressures at the lower contact surfaces and at the upper contact surfaces no longer have such quantitatively large differences, and hence the service life of the plate-link chain, or its torque transmitting capacity, has increased, as was previously intended with the known plate-link chains. On the other hand, the tensile force loading on the upper strap and on the lower strap of the link plate, as the plate-link chain runs around a pair of pulleys set a distance apart, also becomes smaller. Consequently, the maximum tensile forces occurring in the link plates become smaller, which can be utilized to increase the torque transmitting capacity of the plate-link chain in accordance with the invention, for example, compared with the known plate-link chains, so that the plate-link chain can be employed in a motor vehicle drive system that is driven at high torque by an internal combustion engine, for example.

To achieve the spacing ratio described above, a refinement of the invention provides for the rolling surface of the rocker member to be so designed that when the bend angle of the curving plate-link chain is at its maximum, the end of the upper area of the rolling surface is at a distance from the center of mass of the rocker member that is from about 1.1 to about 2 times the distance from the end of the lower area of the rolling surface to the center of mass when the plate-link chain is extended, or is curved in a direction opposite to the direction when the bending angle is at its maximum.

If the plate-link chain runs into the area between a pair of conical disks, and goes from a fully extended condition to a curved condition, then the rolling point between two opposing rocker members, viewed in the direction of rocker member height, shifts away from the center of mass of the rocker member in the upward direction. Then, when the plate-link chain again emerges from the area between the pair of conical disks and again assumes a fully extended position, the rolling point passes into an area below the center of mass.

If the distance from the upper area of the rolling surface, along which the rolling point between a pair of opposing rocker member moves, to the center of mass of a rocker member is measured and compared with the distance from the lower end of the rolling surface to the center of mass, the present invention provides that the upper distance, i.e. the distance from the end of the upper area of the rolling surface to the center of mass is from about 1.1 to about 2 times as great as the distance from the lower end of the rolling surface to the center of mass.

That result can be achieved by appropriately designing the rolling surface on the rocker member described above, for example by having the rolling surface on the rocker member move to the direction above the center of mass in the height direction of the rocker member, but so that it still includes the center of mass of the rocker member when viewed in a projection toward the height direction of the rocker member.

Alternatively, it is also possible to refine the plate-link chain design so that the rocker members bear against the contact surfaces of the link plates in such a way that the ratio of the distance from the end of the upper area of the contact surface to the center of mass and the distance from the lower area of the contact surface to the center point lies within a range of from about 1.1 to about 2. That can be achieved by inserting the rocker member into the link plate opening in a tilted orientation relative to the upper contact surface, for example, so that the rolling surface shifts toward a position above the center of mass of the rocker member when viewed in the height direction of the rocker member.

To achieve a matching of the contact surfaces of the rocker members and the link plates before the plate-link chain is used in a vehicle drive, for example the installation of the plate-link chain in a belt-driven conical-pulley transmission, the present invention provides for the plate-link chain to be pre-stretched before being installed in the motor vehicle drive system. That stretching or straightening process of the plate-link chain causes the contact surfaces of the rocker members and the link plates to be broken in against each other before the plate-link chain is actually utilized.

If the distance between the rolling surfaces of two rocker members situated in a link plate at the contact surfaces is measured, i.e., the distance between a tangential surface bearing against a rolling surface of a rocker member at a right angle to the running direction of the plate-link chain and the tangential surface to the rolling surface of the rocker member bearing against the contact surfaces at the other end of the opening in the link plate, the present invention provides that the distance between the rolling surfaces of two rocker members bearing against the contact surfaces of a link plate is greater than the radius of a rolling surface on the rocker member. The rolling surface radius here corresponds to the radius of the rolling surface in the curved area.

In order to achieve acoustically advantageous behavior of the plate-link chain in accordance with the invention without maintaining a single acoustic tone, the present invention provides for the plate-link chain to have link plates of differing plate lengths.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
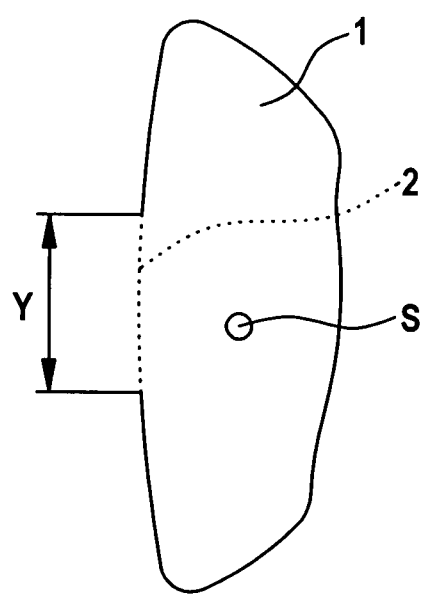
FIG. 1 shows a schematic end view of a rocker member for a known plate-link chain and having a rolling surface.

FIG. 1 shows a schematic end view of a rocker member 1 of a known plate-link chain. Rocker member 1 has a center of mass S and a rolling surface 2, whose length is labeled Y. As can be seen clearly from FIG. 1, rolling surface 2 extends in a height direction of the rocker member and is nearly symmetrical relative to the center of mass S of the rocker member.

Figure 2:
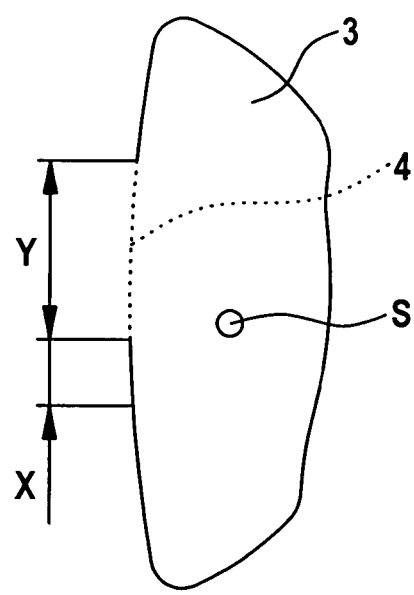
FIG. 2 shows an end view similar to that of FIG. 1 of a rocker member for a plate-link chain in accordance with the invention.

FIG. 2 of the drawing, on the other hand, shows a rocker member 3 in accordance with an embodiment of a plate-link chain in accordance with the present invention. Rocker member 3 also has a rolling surface 4 whose length is Y, but rolling surface 4 has been shifted upward by the amount X in the height direction of the rocker member, relative to the position of rolling surface 2 shown in FIG. 1.

Figure 3:
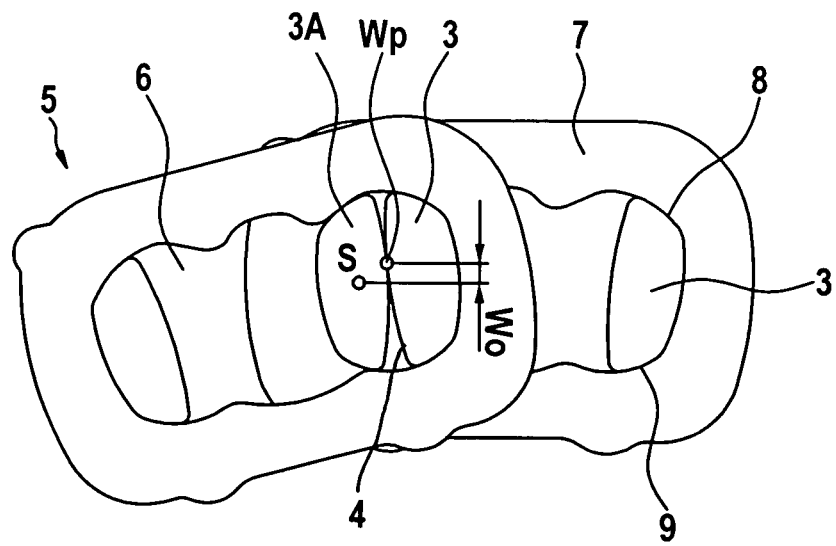
FIG. 3 shows a side view of a portion of a plate-link chain in accordance with the invention, in a curved condition.

If the rocker member 3 shown in FIG. 2 is installed in a plate-link chain 5 in accordance with the invention, a portion of which is shown in FIG. 3, when, as shown, the plate-link chain 5 assumes a curved form relative to a transverse axis passing through the chain, the situation arises that a rolling contact point Wp between two adjacent rocker members 3, 3A shifts into the area of the upper end of rolling surface 4. As the chain curves, the rolling contact point Wp moves and is at a distance from the center of mass S of rocker member 3A, a distance that is labeled Wo in FIG. 3 of the drawing. Rolling contact point Wp is then situated in the position at the upper end of the range of the rolling surface 4, relative to center of mass S, and at a distance Wo from center of mass S. In that position the rocker members 3, 3A are situated in openings 6 in the link plates 7 in such a manner that the rocker members 3 bear on upper contact surfaces 8 and on lower contact surfaces 9, and rocker members 3A of a rocker member pair situated opposite each other can roll on rolling surface 4.

Figure 4:
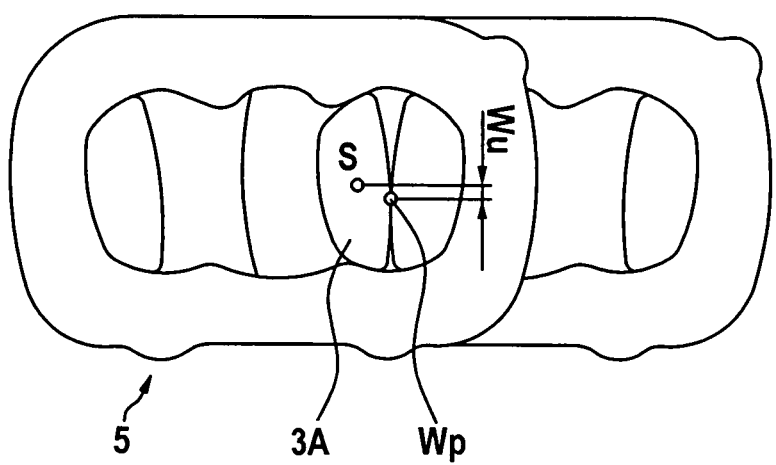
FIG. 4 shows a side view similar to that of FIG. 3 of a portion of a plate-link chain in accordance with the invention in fully extended condition.

If plate-link chain 5 then assumes a fully extended form as shown in FIG. 4 of the drawings, after a directional change as it passes between a pair of conical disks (not shown), rolling point Wp moves from a position above the center of mass, shown in FIG. 3 of the drawings, to a position below center of mass S of rocker member 3A as shown in FIG. 4 of the drawings. The distance from rolling point Wp to the center of mass S in the fully extended form of plate-link chain 5 is labeled Wu in FIG. 4 of the drawings, and is a smaller distance than the distance Wo from rolling point Wp to the center of mass S in the curved condition of plate-link chain 5 shown in FIG. 3. It has been found to be advantageous for the ratio of the distance Wo from the end of the upper area to the center of mass and the distance Wu from the end of the lower area to the center of mass to be in a range of from about 1.1 to about 2.

Figure 5:
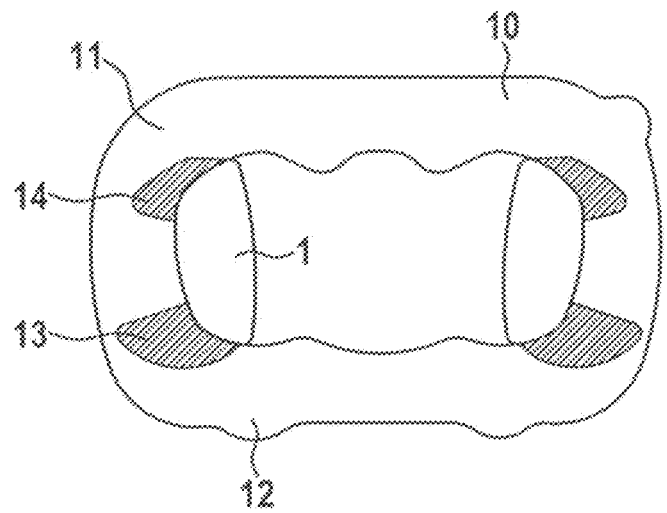
FIG. 5 shows a side view of a link plate of a known plate-link chain to illustrate the surface pressures in the contact surface area.

FIG. 5 of the drawings shows a link plate 10 of a known plate-link chain with a rocker member 1 and representations in hatched form of the surface pressure patterns at the contact surface areas between rocker member 1 and link plate 10. As can be clearly seen, the surface pressure pattern in the hatched area at the lower contact surface designated with the reference numeral 13 between rocker member 1 and the lower plate strap 12 is significantly larger than the surface pressure pattern in the hatched area designated with the reference numeral 14 between rocker member 1 and the upper plate strap 11 of link plate 10.

Figure 6:
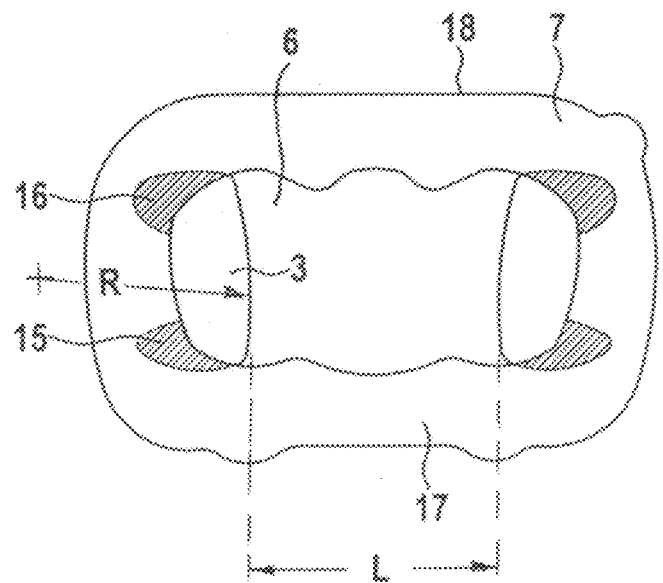
FIG. 6 shows a side view similar to that of FIG. 5 of a link plate of the plate-link chain in accordance with the invention with illustrations of the surface pressures in the contact surface areas.

FIG. 6, on the other hand, shows a similar view of a link plate 7 with a rocker member 3 situated in plate opening 6, and a hatched area designated with the reference numeral 15, which shows the surface pressure pattern at the contact area between rocker member 3 and link plate 7 adjacent the lower plate strap 17 of link plate 7. A comparison of the size of hatched area 13 of FIG. 5 and that of hatched area 15 of FIG. 6 shows that hatched area 15 is significantly smaller in area and in length than hatched area 13, from which fact it is immediately evident that the surface pressure pattern at the lower contact surface area of rocker member 3 and link plate 7 and adjacent the lower plate strap 17 is less than the corresponding surface pressure pattern represented by hatched area 13.

As also shown in FIG. 6, if the distance between the rolling surfaces of two rocker members situated in a link plate at the contact surfaces is measured, i.e., the distance L between a tangential surface bearing against a rolling surface of a rocker member at a right angle to the running direction of the plate-link chain and the tangential surface to the rolling surface of the rocker member bearing against the contact surfaces at the other end of the opening in the link plate, in accordance with the present invention the distance between the rolling surfaces of two rocker members bearing against the contact surfaces of a link plate is greater than the radius R of a rolling surface on the rocker member. The rolling surface radius here corresponds to the radius of the rolling surface in the curved area.

It is also evident that the area and length of the surface pressure pattern shown in FIG. 6 by hatched area 15 corresponds substantially with the area and length of the surface pressure pattern designated by reference numeral 16, the latter of which represents the surface pressure pattern between rocker member 3 and link plate 7 at the contact area adjacent to the upper plate strap 18 of link plate 7. A comparison of FIG. 5 with FIG. 6 shows immediately, and clearly, that the imbalance between the surface pressure patterns represented by hatched areas 13 and 14 shown in FIG. 5 has disappeared, and the surface pressure patterns represented by the hatched areas 15 and 16 shown in FIG. 6 are largely the same. The result is that the load on the material of link plate 7 has been reduced, and the service life and torque transmitting capacity of plate-link chain 5 in accordance with the present invention is accordingly increased.

Figures 7A, 7B:
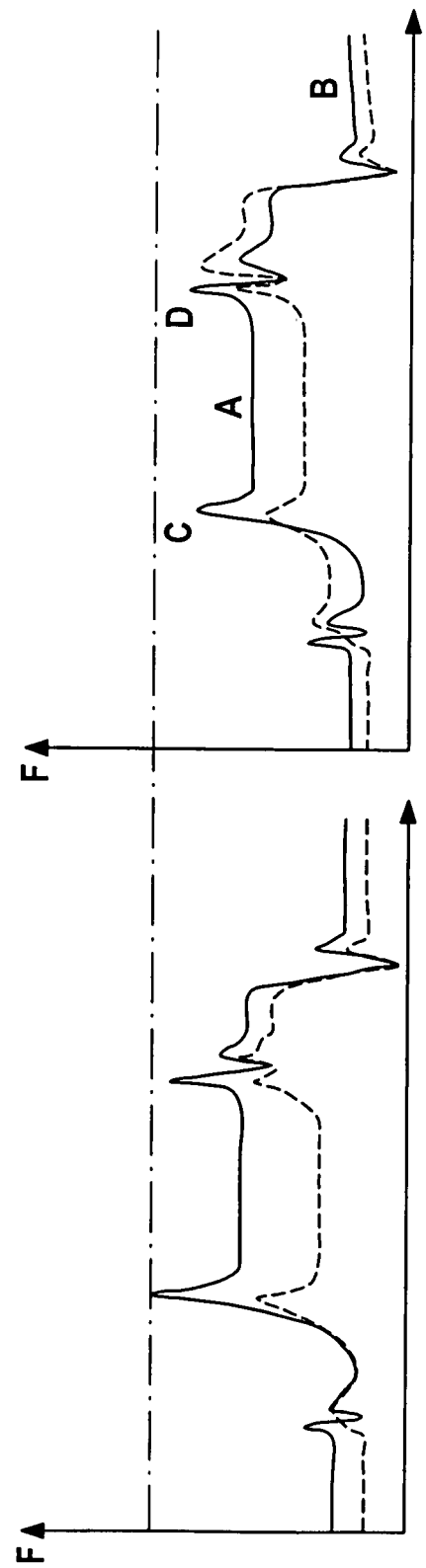
FIG. 7A is a graph showing measured plate force patterns of a known plate-link chain.
FIG. 7B is a graph similar to that of FIG. 7A of measured plate force patterns of the plate-link chain in accordance with the invention.

FIGS. 7A and 7B of the drawings show a comparison of the pattern of plate strap tensile forces in the upper plate strap and in the lower plate strap of a known link plate, shown in FIG. 7A, and in a link plate of a plate-link chain in accordance with the present invention, shown in FIG. 7B. The solid lines represent the lower plate strap forces and the dashed lines represent the upper plate strap forces. The force patterns illustrated correspond to the tensile force patterns that were detected with strain gauges in an experiment during one circulation of a known plate-link chain and of a plate-link chain in accordance with the present invention and that were shown in corresponding force diagrams It is immediately evident that in the force patterns illustrated in FIG. 7B a lower level of the measured plate strap tensile force patterns occurred, in particular in the lower plate strap. That is consistent with the surface pressure patterns shown in FIGS. 5 and 6 of the drawings. The measured plate strap tensile forces became smaller not only at the plateaus A and B—which correspond to the extended condition of the plate-link chain—but also in the peak areas designated as C and D. At areas C and D a change in the tensile force occurs, onto which is superimposed a change occurring during curving of the chain. The interaction of the two changes is surprising, and shows a significantly reduced plate strap force pattern over one circulation of the plate-link chain.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate-link chain for a motor vehicle drive system, said chain comprising: a plurality of link plates having openings and pivotally connected by a plurality of rocker members that extend transversely to the longitudinal direction of the plate-link chain and are positioned in the link plate openings; curved contact surfaces located on a first side of each of the rocker members and on sides of the link plate openings, along which contact surfaces the rocker members and link plates bear against each other to transmit power; curved rolling surfaces formed on a second side of the rocker members, along which pairs of the rocker members roll against each other during curved movement of the chain; wherein in a rocker member cross section plane extending in the longitudinal direction of the plate-link chain and passing through centers of mass of the rocker members a rolling surface contact point between two adjacent rocker members during relative rolling contact extends into an upper contact area above the cross section plane when the chain is in a curved condition as it moves in a curved path about an axis of rotation, and the rolling surface contact point between two adjacent rocker members during relative rolling contact extends into a lower contact area below the cross section plane when the chain is in an extended condition, and wherein the ratio of a first distance from an upper end of the upper contact area to the center of mass and a second distance from a lower end of the lower contact area to the center of mass is in a range of from about 1.1 to about 2, whereby pressure loading at upper and lower contact surfaces between the rocker members and the sides of the link plate openings is substantially uniform.

2. A plate-link chain in accordance with claim 1, wherein the rolling surface of a rocker member is formed so that at a maximum curvature angle of the plate-link chain the upper end of the upper contact area is at a distance from the center of mass of the rocker member that is from about 1.1 to about 2 times the distance from the center of mass to the lower end of the lower contact area when the plate-link chain is extended and also when it is curved in a direction opposite to the maximum curvature angle.

3. A plate-link chain in accordance with claim 1, wherein the rocker members bear against the contact surfaces of the link plate openings in such a way that the ratio of the distance from the upper end of the upper contact area to the center of mass and the distance from the lower end of the lower contact area to the center of mass is in a range of from about 1.1 to about 2.

4. A plate-link chain in accordance with claim 1, wherein the plate-link chain is pre-stretched before being installed in a motor vehicle drive system.

5. A plate-link chain in accordance with claim 1, wherein a rolling surface radius of a rocker member is smaller than a distance between the rolling surfaces of two spaced rocker members that each lie against opposite contact surfaces of a link plate opening.

6. A plate-link chain in accordance with claim 1, wherein the plate-link chain includes link plates having different link plate lengths.

* * * * *